United States Patent [19]

Isacsson

[11] 3,918,561
[45] Nov. 11, 1975

[54] CONVEYOR BRAKE ROLLER
[75] Inventor: Sven E. Isacsson, Saffle, Sweden
[73] Assignee: Brake Roller Company, Battle Creek, Mich.
[22] Filed: Apr. 2, 1973
[21] Appl. No.: 347,192

[52] U.S. Cl. .............................. 193/35 A; 188/184
[51] Int. Cl.² ..................................... B65G 13/075
[58] Field of Search .......... 188/184, 185; 193/35 A, 193/37

[56] References Cited
UNITED STATES PATENTS

| | | | |
|---|---|---|---|
| 1,942,534 | 1/1934 | Burghardt | 188/184 X |
| 3,312,320 | 4/1967 | Froio | 193/35 A |
| 3,576,242 | 4/1971 | Mumma | 193/35 A |
| 3,610,406 | 10/1971 | Fleischauer | 193/35 A X |

FOREIGN PATENTS OR APPLICATIONS

| | | | |
|---|---|---|---|
| 1,246,556 | 8/1967 | Germany | 193/35 A |
| 725,454 | 1/1966 | Canada | 193/35 A |

Primary Examiner—Richard A. Schacher
Assistant Examiner—James L. Rowland
Attorney, Agent, or Firm—Beaman & Beaman

[57] ABSTRACT

A brake roller for conveyor systems wherein a tube rotates about a stationary shaft, and a speed multiplying transmission within the tube powered by the rotation of the tube operates centrifugally operated friction brake members to prevent an excessive rate of tube rotation. Positive drive means are interposed between the tube and the transmission, and the friction brake members centrifugally operated are so constructed as to make the most efficient use of the centrifugal forces available.

2 Claims, 7 Drawing Figures

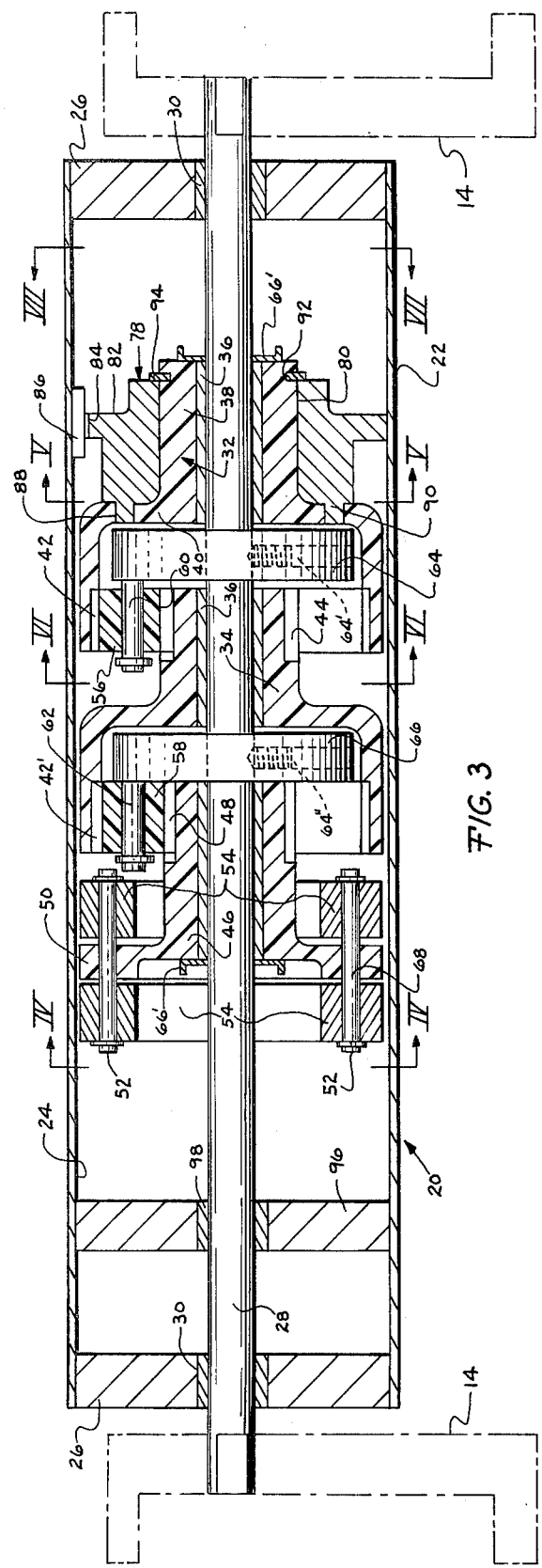

CONVEYOR BRAKE ROLLER

BACKGROUND OF THE INVENTION

The invention pertains to conveyor rollers having automatically operated braking means limiting the rate of roller rotation.

Conveyor systems often utilize a plurality of rotatably mounted rollers disposed in substantially parallel relation upon which the item being conveyed is supported. The rollers, together, often define an inclined plane on which the load moves, and as the rollers are often mounted upon antifriction bearings, gravitational forces permit the load to move at a rapid rate, even though the angle of conveyor inclination may be relatively small.

In order to prevent conveyed items from attaining excessive velocity of movement, braking means are often utilized in the conveyor system, and such braking means may or may not be associated with the load supporting rollers.

The invention pertains to conveyor brakes incorporated into the conveyor rollers, and such devices utilize means for limiting the rate of rotation of the roller, thereby retarding the velocity of the conveyed article during the time it is at least partially supported by the brake roller. In particular, the invention is directed to brake rollers utilizing transmission systems powered by the roller rotation wherein the transmission output operates centrifugally sensitive brake means acting upon the roller interior. Prior devices of this type are unduly complicated and expensive to manufacture, and, in particular, overload means as disclosed in my British Patent 1,237,313 may release preventing the brake roller from functioning under high load conditions when braking is most critical.

BRIEF DESCRIPTION OF THE INVENTION

It is an object of the invention to provide a self-contained conveyor brake roller wherein the brake roller is capable of effectively braking heavy and rapidly moving conveyed loads, and is of a particularly heavy duty construction.

A further object of the invention is to provide a conveyor brake roller utilizing a self-contained speed multiplying transmission wherein the drive means between the roller and the transmission is of a positive and high strength construction, and heavy duty centrifically operated brake elements are powered by the transmission which impose friction braking forces upon the roller.

The invention utilizes a cylindrical tube which defines the conveyor roller. The tube is rotatably mounted upon an axial shaft and houses a two-stage planetary speed multiplying transmission having an input member and an output member. The input member is keyed to the tube in a positive non-yielding manner, and the output member supports a plurality of pivotally mounted friction brake levers or shoes which engage the concentric inner surface of the tube in a frictional manner which increases proportional to the increase of tube rotation. Thus, the greater the rate of rotation of the tube the greater will be the restraining forces against tube rotation as produced by the brake shoes, producing a controlled roller rotation which effectively functions to retard the rate of movement of conveyed loads.

An object of the invention is to provide a high strength, heavy duty conveyor brake roller which may be economically constructed, readily assembled and maintained. Additionally, the brake roller is self-contained and the roller tube serves as the housing for the operating mechanism.

DESCRIPTION OF THE DRAWINGS

The aforementioned objects and advantages of the invention will be appreciated from the following description and accompanying drawings wherein:

FIG. 3 is an elevational, sectional view of the conveyor brake roller as taken on a diameter, FIG. 6 is an elevational, sectional view illustrating the gear arrangement of the transmission as taken along Section VI—VI of FIG. 3, and FIG. 7 is an elevational, sectional view as taken along Section VII—VII of FIG. 3.

DESCRIPTION OF THE PREFERRED EMBODIMENT

Figure 1:
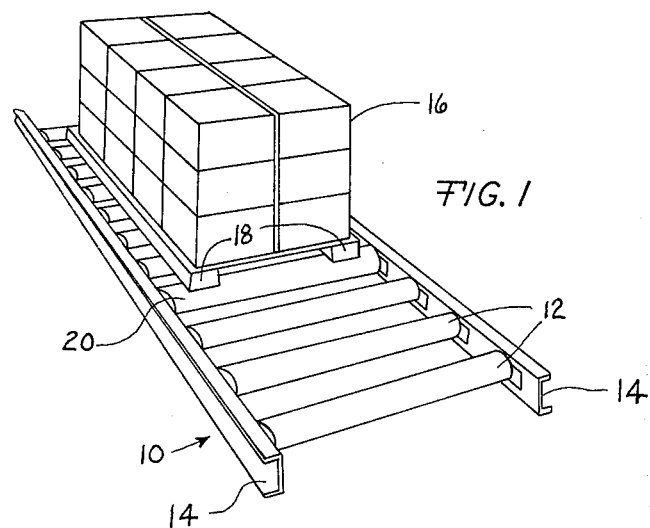
FIG. 1 is a perspective view of a conveyor and conveyed load illustrating the environment of use of the invention.

The environment in which a conveyor brake roller in accord with the invention is used is illustrated in FIG. 1. A roller type conveyor is generally indicated at 10, consisting of a plurality of parallel rollers 12 freely rotatably mounted between support channel rails 14. Usually, the rails 14 will be inclined slightly to the horizontal whereby the load, as generally indicated at 16, will be moved by gravity along the rollers 12. Of course, the conveyor may be horizontally disposed, if desired.

The load 16 is mounted upon a pair of parallel skids 18, and these skids sequentially engage the rollers 12 as the load is conveyed. A brake roller 20 is mounted within the illustrated conveyor, and its rate of rotation is retarded, as will be later described, thus imposing a braking force on the load 16, if the load's rate of movement is greater than that permitted by the brake roller.

Many conveyors are of considerable length, and if it is desired to exert significant braking action on conveyed loads, a plurality of brake rollers 20 will be included in the construction of the conveyor. Usually, each roller will not constitute a brake roller. Under some conditions every fifth or sixth roller may be a brake roller, and the frequency of brake roller requirement will be determined by the pitch of the conveyor and the weight and length of the loads being conveyed.

Figure 2:
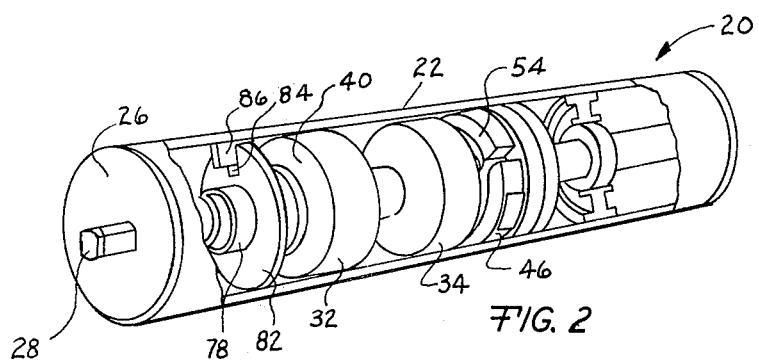
FIG. 2 is a perspective, cutaway view of a brake roller in accord with the invention.

The construction of the brake roller will be appreciated from FIGS. 2 and 3. The brake roller basically consists of a cylindrical tube 22 having an exterior surface which engages the conveyed load, and a cylindrical inner surface 24. End plates 26 are received within the ends of the roller tube, and at least one of these plates is removable in order to permit assembly and disassembly of the braking structure within the tube. The end plates 26 are rotatably mounted by bearings 30 on an elongated shaft 28 having ends fixed within and in respect to the supporting rails 14, and it will therefore be appreciated that the tube 22 is freely rotatably mounted upon the shaft 28.

A pair of transmission ring gear members 32 and 34 are rotatably mounted upon the shaft 28 within the tube 22 upon bearings 36. The member 32 includes an axially extending hub portion 38 and a radial flange 40 supporting an axial portion in which the internal gear teeth 42 are formed. The member 34 is of a similar construction having ring gear teeth 42', but additionally includes gear teeth 44 defined in its hub portion. The member 32 constitutes an input member for the transmission.

The transmission output member 46 includes a hub portion having gear teeth 48 defined therein, and radially extending flange 50 serves as the support for a pair of pivot pins 52 upon which the brake levers 54 are pivotally mounted.

Planetary gears 56 and 58 are rotatably mounted upon pins 60 and 62 within the circular disks 64 and 66, and these disks are fixed to the shaft 28 by set screws 64' and 64'', FIG. 3. As will be appreciated in FIG. 3, the planetary gears 56 mesh with the teeth 42 and the teeth 44, while the planetary gears 58 mesh with gear teeth 42' and 48. Axial positioning of the described transmission input and output members is maintained upon the shaft 28 by retainer washers 66' fixed to the shaft.

The ratio of diameters of the transmission gear teeth, and the number of teeth, is such that the output member 46 will rotate at approximately nine times the rate of the tube 22, and this rotational velocity is sufficient to produce the desired centrifugal forces within the brake levers 54 to perform the desired braking action.

Figure 4:
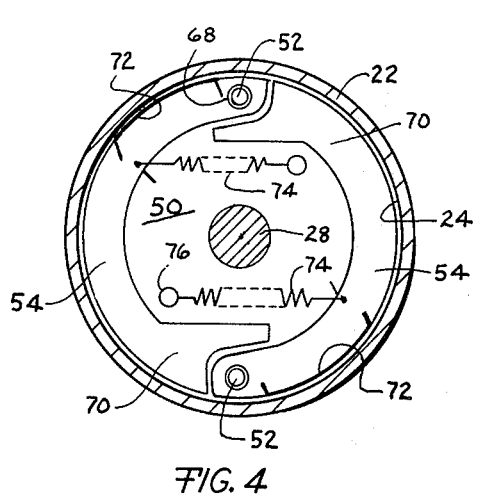
FIG. 4 is an elevational, sectional view illustrating the brake lever construction taken along Section IV—IV of FIG. 3.
Figure 5:
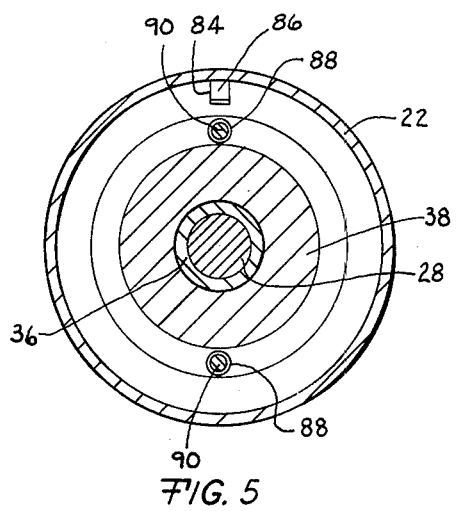
FIG. 5 is an elevational, sectional view as taken along Section V—V of FIG. 3.

The configuration of the brake levers 54 is best appreciated from FIG. 4. In the disclosed embodiment four brake levers 54 are pivotally mounted upon the output member 46 upon the two pivot pins 52, two levers being mounted upon each pin. Each brake lever is of an arcuate configuration comprising approximately one half of a circular segment, at one end region a hole 68 is provided in which a pivot pin 52 is received, and the "outer" end region of the brake levers is indicated at 70. Friction pads 72 are mounted upon the levers 54 adjacent the pivot pins, and such friction material may consist of leather, or similar friction brake material as used in the automotive field, and in like applications.

It will be noted that the friction pads 72 are located adjacent the pivot pin of the associated lever, and the portion of the brake lever between the friction pad and the outer end 70 forms the majority of the mass of the lever upon which centrifugal forces are imposed. By locating the friction pads adjacent the pivot, a mechanical advantage is achieved which increases the force holding the friction material against the tube inner surface 24 to achieve the braking action, achieving optimum utilization of the centrifugal forces available.

In order to provide an element of control as to the rotational speeds at which braking occurs, a tension spring 74 is interposed between each lever 54 and an output member anchor 76 tending to bias the associated lever inwardly against the centrifugal force. By varying the physical characteristics of the springs 74 a regulation of the operating characteristics of the brake may be achieved, and such springs aid in the assembly of the brake roller as the levers 54 will be inwardly retracted when the shaft and transmission assembly is inserted through the end of the tube, as this is the mode of assembly of the device.

The transmission is positively connected to the tube by means of an annular drive member 78 fixed upon the hub portion 38 of the input member 32. The drive member 78 includes a hub having a bore 80 permitting the drive member to be placed upon the hub portion 38. The drive member also includes a radially extending flange having a circular configuration and a diameter substantially equal to the inner diameter of the tube. A radial slot 84 is formed in the flange 82, and the slot receives a key 86 welded to the inside of the tube 22 forming a positive driving connection between the drive member 78 and the tube.

The input member flange 40 is provided with a pair of axially extending holes 88 radially spaced from the shaft 28, and the drive member includes a pair of axially extending projections 90 closely received within the holes 88, FIG. 3. An annular groove 92 defined upon a hub portion 38 receives a snap ring 94 bearing against the outer end of the drive member hub whereby the snap ring, and the flange 40 axially locate the drive member 78 upon the input member 32, and maintain the projections 90 within the holes 88. In this manner the drive member becomes a rigid part of the input member and no relative rotational displacement is possible.

Auxiliary bearing means and support for the tube may be mounted upon the shaft intermediate the transmission and the end plates. Such an auxiliary bearing element is shown at 96, and includes a disk having a circular configuration engaging the inner surface of the tube 22, and an inner bearing 98 which may be of the antifriction type, rotatably supports the disk relative to the shaft 28.

In use, the brake roller 20 is mounted within the conveyor, FIG. 1, and as the transmission and braking structure is wholly mounted within the roller, the appearance of the brake roller is no different than that of the other rollers 12 of the conveyor. Upon the load 16 engaging the outer surface of the tube 22, and rotating the same due to its forward movement, the tube rotation will produce a corresponding rotation of the transmission as the shaft 28 is fixed to the rails 14 in such a manner as to render the shaft stationary. Rotation of the drive member 32, and gear member 34, produces a rotation of the output member 46 at a velocity considerably greater than the tube rotation, for instance, nine times as great.

The rotation of the output member 46, and brake levers 54, tends to radially pivot the levers outwardly engaging the friction pads 72 with the inner surface 24 of the tube. The faster the tube 22 is rotated the greater the frictional engagement between the brake levers and the tube, and a drag is imposed on the tube 22 resisting rotation thereof, causing the roller 20 to function as a brake and decelerating the forward motion of the load 16.

The tube roller 20 readily rotates at low speeds with very little resistance, as at such speeds the centrifugal forces are not sufficient to overcome the springs 74, and the only "drag" imposed on tube rotation by the transmission is the frictional forces existing within the transmission.

From the above, it will be appreciated that the roller effectively produces a braking action when used in a conveyor of the disclosed type, and the number of braking rollers necessary to be used in a conveyor depends upon the pitch of the conveyor, and the weight and configuration of the load conveyed.

Preferably, the members 32, 34, 46, and gears 56 and 58 are formed of synthetic plastic, such as nylon, while the levers 54 are preferably of metal. As the brake roller is self-contained and self-powered, it requires little maintenance, and is capable of a long effective life with little or no attention required.

It is appreciated that various modifications to the invention may be apparent to those skilled in the art without departing from the spirit and scope thereof.

I claim:

1. A conveyor brake roller comprising, in combination, an elongated cylindrical tube having an axis, opposite ends and an inner cylindrical surface concentric to said axis, a shaft coaxially extending through said tube having ends extending beyond the tube ends adapted to be stationarily fixed, a speed increasing transmission within said tube, said transmission comprising a plurality of interconnected planetary gearing assemblies each including rotatable input and output members coaxially rotatable about said tube axis, said transmission including a first stage assembly and a last stage assembly, the output member of said first stage assembly being connected to and driving the input member of the adjacent assembly, radially movable centrifugally operated friction brake members mounted upon the output member of said last stage asembly frictionally engageable with said inner cylindrical surface, an annular hub concentrically fixedly mounted on said first stage assembly input member, and keying means mounted on the interior of said tube fixed with respect to said tube against relative rotation thereto about said axis and drivingly connected to said hub.

2. A conveyor brake roller comprising, in combination, an elongated cylindrical tube having an axis, opposite ends and an inner cylindrical surface concentric to said axis, a shaft coaxially extending through said tube having ends extending beyond the tube ends adapted to be stationarily fixed, a speed increasing transmission within said tube having rotatable input and output members coaxially rotatable about said tube axis, said input member including an axially extending hub portion and a radially extending flange having axially extending holes defined therein, radially movable centrifugally operated friction brake members mounted upon said output member frictionally engageable with said inner cylindrical surface, a key fixed upon said tube, and drive means rigidly connected to said transmission input member engaged with said key wherein said key and drive means produce a positive driving of said transmission, said drive means comprising an annular hub concentrically mounted upon said hub portion having a periphery, a radially extending slot defined in said hub intersecting said periphery and receiving said key, a plurality of axially extending projections defined on said hub each received within a flange hole locking said input member and hub against relative rotational displacement about said tube axis, and retaining means defined on said hub portion preventing axial displacement between said hub and hub portion maintaining said projections within the associated hole.

* * * * *